United States Patent

[11] 3,612,542

[72] Inventor Donald W. Marcinkus
Arlington Heights, Ill.
[21] Appl. No. 877,971
[22] Filed Nov. 19, 1969
[45] Patented Oct. 12, 1971
[73] Assignee Ampex Corporation
Redwood City, Calif.

[54] TRACK SELECTOR SYSTEM FOR A CASSETTE PLAYBACK DEVICE
3 Claims, 1 Drawing Fig.

[52] U.S. Cl. ........................................................ 274/4 D
[51] Int. Cl. ........................................................ G11b 15/44
[50] Field of Search ........................................... 274/4 R, 4 C, 4 E, 4 F, 4 D; 242/198–200; 226/49, 50

[56] References Cited

UNITED STATES PATENTS 3,127,178 3/1964 Osborn et al. ................ 274/4 F
3,257,515 6/1960 Nakamatzu .................. 274/4 D

*Primary Examiner*—Harry N. Haroian
*Attorneys*—Anderson, Luedeka, Fitch, Even & Tabin and Robert G. Clay

ABSTRACT: A track selector system for a cassette changer of the type in which a series of cassettes carried in a magazine are lowered in sequence into position to be played back by a playback device. The system includes a pair of switches which are actuated in different combinations of switching positions to provide a side 1 only, a side 2 only and both sides 1 and 2 switching positions. The system energizes a drive motor in the playback device if the switching position of the pair of switches corresponds with the position of a third or sensing switch which senses the direction of playback called for by the playback device. Otherwise, a control circuit is energized to either reverse the direction of playback or eject the cassette.

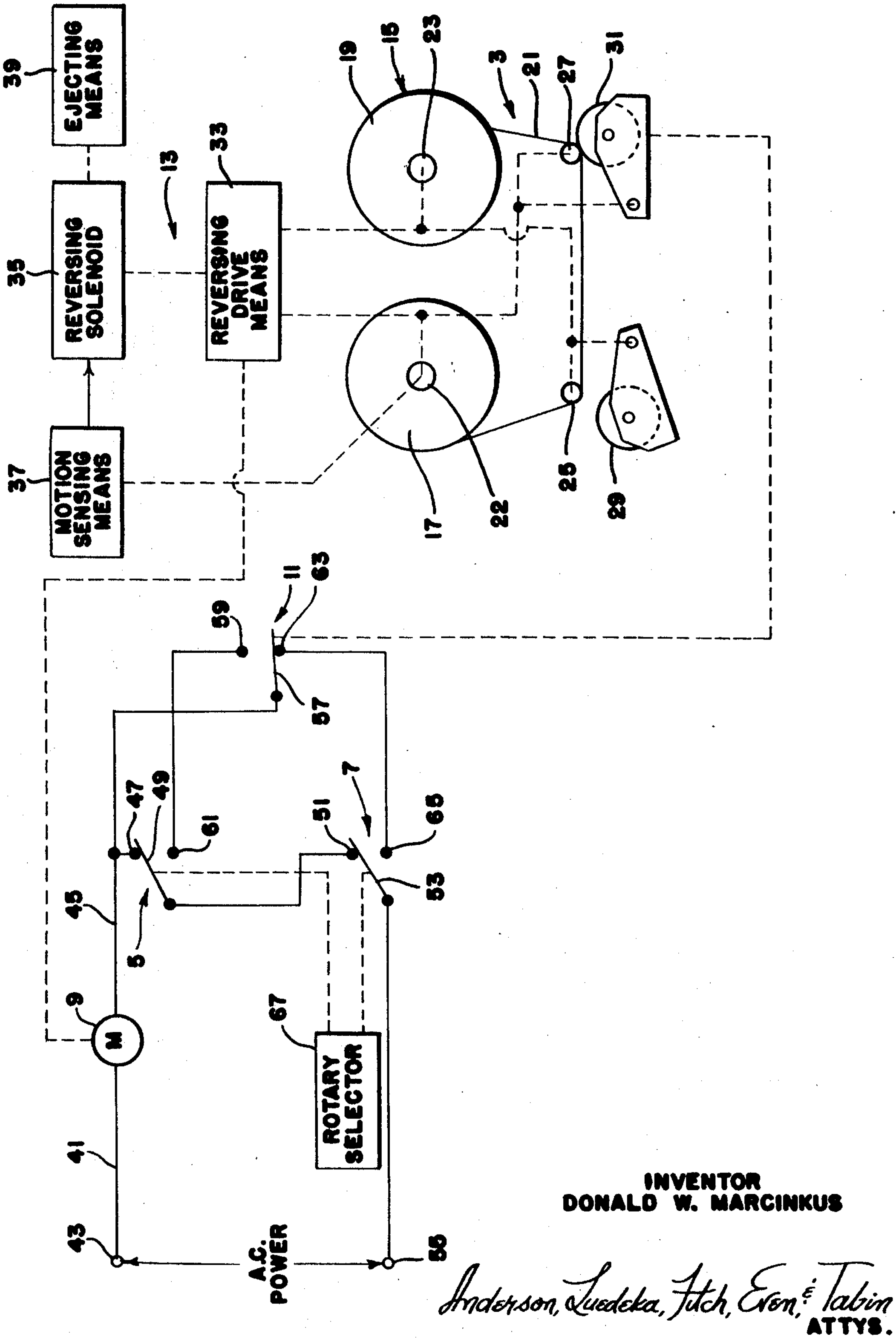
INVENTOR
DONALD W. MARCINKUS
Anderson, Luedeka, Fitch, Even & Tabin
ATTYS.

TRACK SELECTOR SYSTEM FOR A CASSETTE PLAYBACK DEVICE

The present invention relates to a track selector system for a cassette playback device.

Normally, a cassette includes a pair of rotatably mounted reels having a tape extending therebetween which has four tracks of information recorded thereon. Two of the tracks (commonly referred to as "side 1") are played back when the tape is moved in the forward direction and the other two tracks (commonly referred to as "side 2") are played back when the tape is moved in the reverse direction.

In most of the cassette playback devices previously marketed, it has been necessary to manually insert the cassette into the device. Recently, however, a playback device has been built which automatically plays back, in sequence, a plurality of cassettes contained in a magazine. In such playback devices, which are commonly called "cassette changers," one of the cassettes in the magazine is lowered into its playback position, the tape is moved forward and side 1 is played back. At the end of side 1, the tape is automatically reversed and side 2 is played back. At the end of side 2, the cassette is automatically ejected from its playback position and is returned to the magazine.

A manually operated switch is provided on this playback device to cause the device to either playback both sides 1 and 2, as described above, or to playback side 1 only. The playback device would playback side 2 only if the cassette was properly wound for side 2 play when it was inserted into the playback position and the track selection switch was in its both sides 1 and 2 position. However, the cassette would not normally be wound in such a manner and it would be necessary to listen to at least part of side 1 to play back side 2. This is disadvantageous in certain applications where it is desired to play back only side 2 without listening to side 1.

An object of the present invention is the provision of a track selector control system for a cassette playback device which provides for the playback of side 1 only or side 2 only or both sides 1 and 2. Another object of the present invention is the provision of an improved track selector system for a cassette changer which is relatively simple in construction and inexpensive to manufacture.

Other objects and advantages of the present invention will become apparent by reference to the following description and accompanying drawing in which the single figure is a schematic diagram of a track selector system in accordance with the present invention.

In general, the track selector system of the present invention is employed in a cassette changer of the type in which a series of cassettes carried in a magazine (not shown) are lowered in sequence into position to be played back by a playback device 3. Such a changer has been commonly referred to as a Staar changer. The system includes a pair of switches 5 and 7 which are actuated in different combinations of switching positions to provide a side 1 only, a side 2 only and both sides 1 and 2 switching positions. The system energizes a drive motor 9 in the playback device 3 if the switching position of the pair of switches 5 and 7 correspond with the position of a third or sensing switch 11 which senses the direction of playback called for by the playback device 3. Otherwise, a control circuit 13 in the playback device 3 is energized to either reverse the direction of playback or eject the cassette 15.

More particularly, the cassette 15, which includes a pair of spaced, rotatably mounted reels 17 and 19 with a tape 21 extending therebetween, is played back in the cassette changer by the playback device 3. The playback device 3 includes the single phase, alternating current drive motor 9 which is connected to the cassette 15 so as to either drive the tape 21 either in a forward direction or in a reverse direction. In this connection, the playback device 3 includes a pair of reel shafts 22 and 23 which engage the reels 17 and 19, respectively, of the cassette 15 and a pair of capstans 25 and 27 and associated pivoted pinch rollers 29 and 31. A reversible drive means 33 either connects the drive motor 9 to the right-hand reel shaft 23 and right-hand capstan 27 and causes the right-hand pinch roller 31 to press the tape 21 against the capstan 27 to drive the tape to the right to play back side 1 or connects the drive motor 9 to the left-hand reel shaft 22 and capstan 25 and causes the left-hand pinch roller 29 to press the tape against the capstan 25 to drive the tape to the left to play back side 2. The change of direction from side 1 to side 2 of playback (the unit is automatically in side 1 upon insertion of the cassette into the unit) is selected by a reversing solenoid 35 which is pulsed by a motion sensing means 37 that senses the rotation of the reel shaft 22.

The playback device 3 is arranged so that when the cassette 15 is lowered into position, the playback device is conditioned to play back side 1, i.e., the reversible drive means will cause the tape to be moved to the right. When the playback of side 1 is completed, the reel supplying the tape stops rotating and this lack of rotation is sensed by the motion sensing means 37 which pulses the reversing solenoid 35. The reversing solenoid 35, the first time it is pulsed, causes the reversible drive means 33 to switch positions to cause the tape to move in the opposite direction (to the left) to play back side 2. When the playback device 3 completes playing back side 2, the reels stop rotating and this lack of rotation is sensed by the motion sensing means 37 which pulses the reversing solenoid 35. On this second pulse, the reversing solenoid 35 actuates an ejecting means 39 which causes the cassette 15 to be ejected from its playback position and returned to its position in the magazine.

In the illustrated embodiment, one conductor 41 of the drive motor 9 is connected to an AC power terminal 43. The other conductor 45 of the drive motor is connected to a first fixed contact 47 of the first switch 5 which is a single pole, double throw switch. A movable contact 49 of the first switch 5 is connected to a first fixed contact 51 of the second switch 7 which is a single pole, double throw switch. A movable contact 53 of the second switch 7 is connected to the other terminal 55 of the power supply.

The other conductor 45 of the drive motor 9 is also connected to a movable contact 57 of the third switch 11 which is a single pole, double throw switch and which is connected to the playback device 3 so as to indicate whether the playback device is conditioned to play back side 1 or side 2. In the illustrated embodiment, the movable contact 57 is connected to the arm of one of the pinch rollers 31 so that it is in its upper position when the playback device is conditioned to play back side 2 and in its lower position when the playback device 3 is conditioned to play back side 1. A first or upper fixed contact 59 of the third switch 11 is connected to a second fixed contact 61 of the first switch 5, and a second or lower fixed contact 63 of the third switch 11 is connected to a second fixed contact 65 of the second switch 7.

The movable contacts 49 and 53 on the first and second switches 5 and 7 are actuated by a manually operated, rotary selector switch 67 which has three positions; a side 1 and 2 position, a side 1 only position, and a side 2 only position. In its side 1 and 2 position, the movable contacts 49 and 53 are in the position shown in the drawing, that is, the movable contacts 49 and 53 are in contact with the upper or first fixed contacts 47 and 51, respectively, In this position of the rotary selector switch 67, when the cassette 15 is inserted into the playback device 3, side 1 will be played back, then side 2 and the cassette will be ejected. When the rotary selector switch 67 is moved to its side 1 only position, the movable contact 53 in the second switch 7 is moved to make contact with its lower or second fixed contact 65. If the third switch 11 is in its side 1 or lower position, which would normally occur when the cassette 15 is inserted into the playback device 3, side 1 will play back and, when the reels stop rotating, indicating the end of side 1 playback, the motion sensing means 37 causes the reversible drive means 33 to switch to its side 2 mode of operation. However, since the third switch 11 moves to its side 2 position there is an open circuit to the drive motor 9 and the cassette 39 will not be operated. The motion sensing means 37 will sense this lack of movement and will cause the cassette 15 to be ejected.

When the rotary selector switch 67 is moved to its side 2 only position, the movable contact 49 of the first switch 5 is moved to make contact with the lower or second fixed contact 61 and the movable contact 53 of the second switch 7 is returned to its upper position. With the first and second switches 5 and 7 in this position, the cassette 15, when it is inserted into the playback device 3, will not be driven in its forward direction to play back side 1 since the third switch 11 will be in its side 1 position and hence there is an open circuit to the drive motor 9. The motion sensing means 37 will pulse the reversing solenoid 35 which, in turn, causes the playback device 3 to reverse its mode of operation. This causes the third switch 11 to be moved to its side 2 position and the drive motor 9 will be energized to cause movement of the tape 21 in its reverse direction. When the end of the tape is reached, the reels will stop rotating, which lack of rotation will be sensed by the motion sensing means 37, and it will pulse the reversing solenoid 35 which in turn causes the cassette 15 to be ejected from the playback device 3.

Various changes and modifications may be made in the above-described track selector system without deviating from the spirit or scope of the invention.

Various features of the present invention are set forth in the accompanying claims.

What is claimed is:

1. In combination with a cassette playback device having a pair of reel shafts for receiving the reels of a cassette, a pair of capstans, a pinch roller associated with each of said capstans, a drive motor and means for connecting said drive motor to said capstans, reel shafts and pinch rollers to cause the tape in the cassette to move in a forward direction in a first mode of operation and in a reverse direction in a second mode of operation, a track selector system comprising a first, a second and a third switch means, each of said switch means having a first, a second, and a third terminal, a pair of power terminals for providing electrical power, said motor having a pair of conductors for supplying power thereto, one of said conductors being connected to one of said power terminals, the other conductor being connected to the first terminal of the first switch means and to the second terminal of the third switch means, the third terminal of the first switch means being connected to the first terminal of the third switch means, the second terminal of the first switch means being connected to the first terminal of the second switch means, the third terminal of the second switch means being connected to the third terminal of the third switch means, a first connecting means for connecting the second contact of said first switch means to either its first terminal or its third terminal, a second connecting means for connecting the second terminal of said second switch means to either its first terminal or its third terminal, a third connecting means for connecting the second terminal of said third switch means to either its first terminal or its third terminal, means responsive to the mode of operation of said playback device for actuating said third connecting means of the third switch means to connect it to said first terminal of said third switch means when the playback device is in its second mode of operation and to its third terminal when the recorder is in its first mode of operation, and additional means for actuating the said first and second connecting means, said additional actuating means having three operating positions, a first position in which the first and second connecting means are electrically connected to their respective first terminals, a second operating position in which the second connecting means is in electrical contact with its third terminal, whereby the playback device only plays back in its first mode of operation and a third position in which the first connecting means is in electrical contact with its third terminal, whereby the playback device only plays back in its second mode of operation.

2. The combination of claim 1 wherein the switching means are single pole, double throw switches with the first and third terminals being connected to the fixed contacts of the switch and the second terminal being connected to the movable contact of the switch.

3. The combination of claim 2 wherein the playback device is part of a cassette changer, means are provided for conditioning said playback device to a playback side 1 mode of operation when the cassette is first inserted, means are provided to sense lack of movement of the tape in the cassette and to switch said playback device from playback of side 1 mode of operation to a playback side 2 mode of operation if no movement is sensed and then to eject the cassette if no tape movement is sensed in the side 2 mode of operation.